United States Patent [19]

Bair et al.

[11] Patent Number: 5,383,538
[45] Date of Patent: Jan. 24, 1995

[54] BRAKE SQUEAL SPRING CLIP DAMPENER

[75] Inventors: John J. Bair, Plainwell; Lee A. Freel, Clarkton; Gerald D. Damon, Farmington; Jerry D. Woods, Milford, all of Mich.

[73] Assignee: Eaton Corporation, Cleveland, Ohio

[21] Appl. No.: 131,163

[22] Filed: Oct. 4, 1993

[51] Int. Cl.6 .......................... F16D 65/10; F16F 1/18
[52] U.S. Cl. ................. 188/218 R; 267/160; 301/6.91
[58] Field of Search ............ 188/218 R, 218 A, 73.38; 301/6.1, 6.91; 267/161, 163, 164, 165, 160

[56] References Cited

U.S. PATENT DOCUMENTS

| | | | |
|---|---|---|---|
| 1,314,337 | 8/1919 | Kimmey | 267/160 X |
| 1,791,495 | 2/1931 | Frey | |
| 1,801,712 | 4/1931 | Barrett et al. | |
| 2,197,583 | 4/1940 | Koeppen et al. | 301/6 |
| 2,349,658 | 5/1944 | Horn | 188/218 |
| 2,489,522 | 11/1949 | Chase | 188/218 |
| 2,588,665 | 3/1952 | Sinclair | 188/218 |
| 2,639,195 | 5/1953 | Bock | 301/6 |
| 2,962,324 | 11/1960 | Swanberg | 301/6 |
| 3,163,469 | 12/1964 | Huhtala | 301/6 |
| 4,635,882 | 1/1987 | SenGupta et al. | 244/119 |
| 4,720,088 | 1/1988 | Tamura | 267/160 X |

Primary Examiner—Robert J. Oberleitner
Assistant Examiner—Kevin D. Rutherford
Attorney, Agent, or Firm—Loren H. Uthoff, Jr.

[57] ABSTRACT

A drum brake spring clip dampener for reducing the level of brake squeal noise where the spring clip dampener includes a leaf spring disposed into a gap formed between a wheel rim and an annular brake drum squealer band and where the leaf spring is held in position by two inner tabs and an outer tab where the spring clip dampener thereby introduces a separation force and vibration dampening.

7 Claims, 2 Drawing Sheets

FIG 3
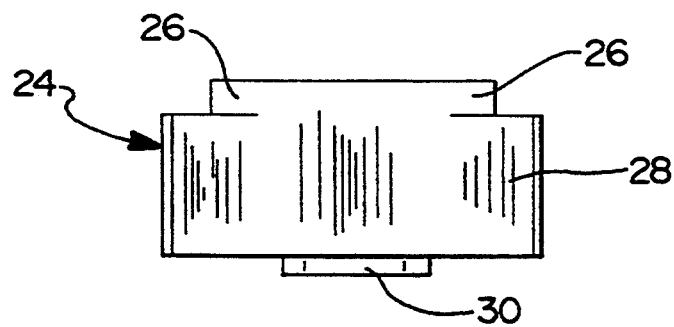
FIG 4
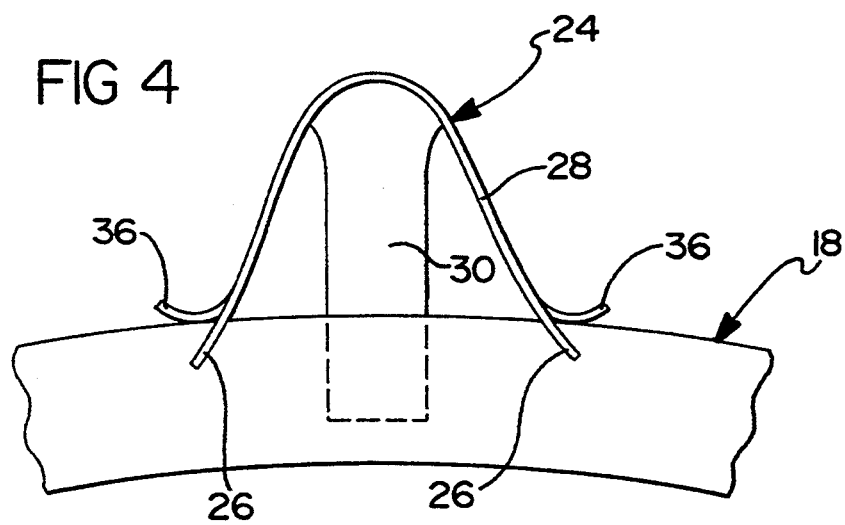
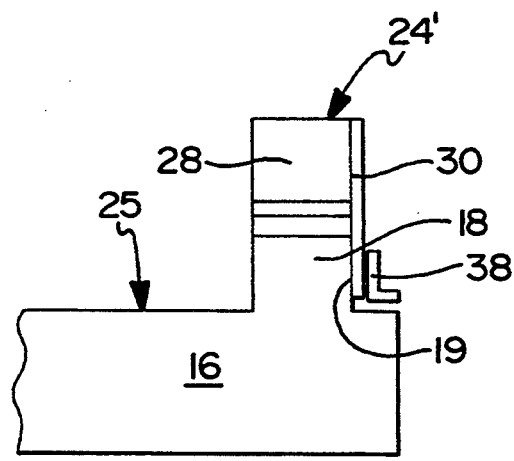
FIG 5

BRAKE SQUEAL SPRING CLIP DAMPENER

RELATED APPLICATION

This application is related to application U.S. Ser. No. 08/131,350 entitled "Brake Squeal Damper Ring" assigned to the same assignee, Eaton Corporation, as this application and filed the same date Oct. 4, 1993, as this application.

FIELD OF THE INVENTION

This invention relates to a device to reduce brake squeal. More specifically, the present invention relates to a device to reduce brake squeal by introducing a dampening force between the wheel and brake squealer band using a plurality of spring clip dampeners.

BACKGROUND OF THE INVENTION

Brake squeal noise occurs upon application of a vehicle brake when the structure of the brake drum resonates at its natural frequencies due to forces imparted by the brake pad frictionally engaging the inner surface of the brake drum. The sound pressure level produced by the vibrating drum can become quite objectionable to receivers in the immediate area thereby prompting manufacturers of brake drums and other driveline components to modify the brake drums using various means to reduce vibration levels of the drum. Methods commonly used include adding dampening to alter the resonant qualities of the brake drum thereby reducing the amplitude of vibration so as to reduce the sound level produced when brake squeal occurs.

Prior art methods of reducing the vibrational amplitude of a brake drum have included adding various additional structures such as retention bands and/or dampening layers to the outside of the drum with varying degrees of effectiveness. The problem with these prior art approaches generally has been the complexity and expense introduced with the added components where the cost to benefit ratio has not proved to be practical. Another significant problem introduced whenever a layer of material is added to the outside structure of the brake drum is that the rate of heat rejection is dramatically reduced, thereby reducing the service life of the drum due to higher operating temperatures. Examples of these prior art methods can be found by reference to U.S. Pat. Nos. 2,349,658 and 2,639,195, the disclosures of which are hereby incorporated by reference.

SUMMARY OF THE INVENTION

The present invention reduces the amplitude of vibration of the brake drum by providing frictional dampening at the brake drum squealer band by inserting a plurality of spring clip dampeners between the vehicle wheel and the inner edge of the brake drum engaging the top of the squealer band. A separation force is introduced by the spring clip dampeners which react against the inside of the wheel rim and are forced down into or towards the squealer band where the two ends of the spring clip dampener rub against the outside of the squealer band thereby providing for frictional dampening. The spring clip dampener is held in place by both an inner and outer tab which engage the inner and outer edge of the squealer band respectively. In this manner, the spring clip dampeners can be easily installed or removed with excellent retention in the desired operational position.

One provision of the present invention is to introduce a degree of frictional dampening at the brake drum squealer band.

Another provision of the present invention is to introduce a degree of frictional dampening at the brake drum squealer band utilizing a plurality of spring clip dampeners reacting against the squealer band and wheel rim.

Another provision of the present invention is to introduce a separation force and frictional dampening between the vehicle wheel and vehicle brake drum squealer band using a plurality of spring clip dampeners preferably in a form of a leaf spring extending from an inner edge on the vehicle wheel to the brake drum squealer band where two ends of the spring clip dampener rub against the squealer band thereby creating frictional dampening.

Another provision of the present invention is to introduce a separation force and frictional dampening between the vehicle wheel and brake drum squealer band using a spring clip dampener having an inner and outer retention tab which engages the squealer band to hold the dampener spring clip in position.

Still another provision of the present invention is to introduce a separation force and frictional dampening between the vehicle wheel and brake drum squealer band using a spring clip dampener having an outer retention tab held against the outer face of the squealer band by a retention ring.

BRIEF DESCRIPTION OF THE DRAWINGS

FIG. 3 is a top view of the spring clip dampener of the present invention;

FIG. 4 is a front elevational view of the spring clip dampener of the present invention mounted to a brake squealer band; and FIG. 5 is a side elevational view of an alternate embodiment of the spring clip dampener of the present invention held in place by a retention ring.

DETAILED DESCRIPTION OF THE PREFERRED EMBODIMENTS

Figure 1:
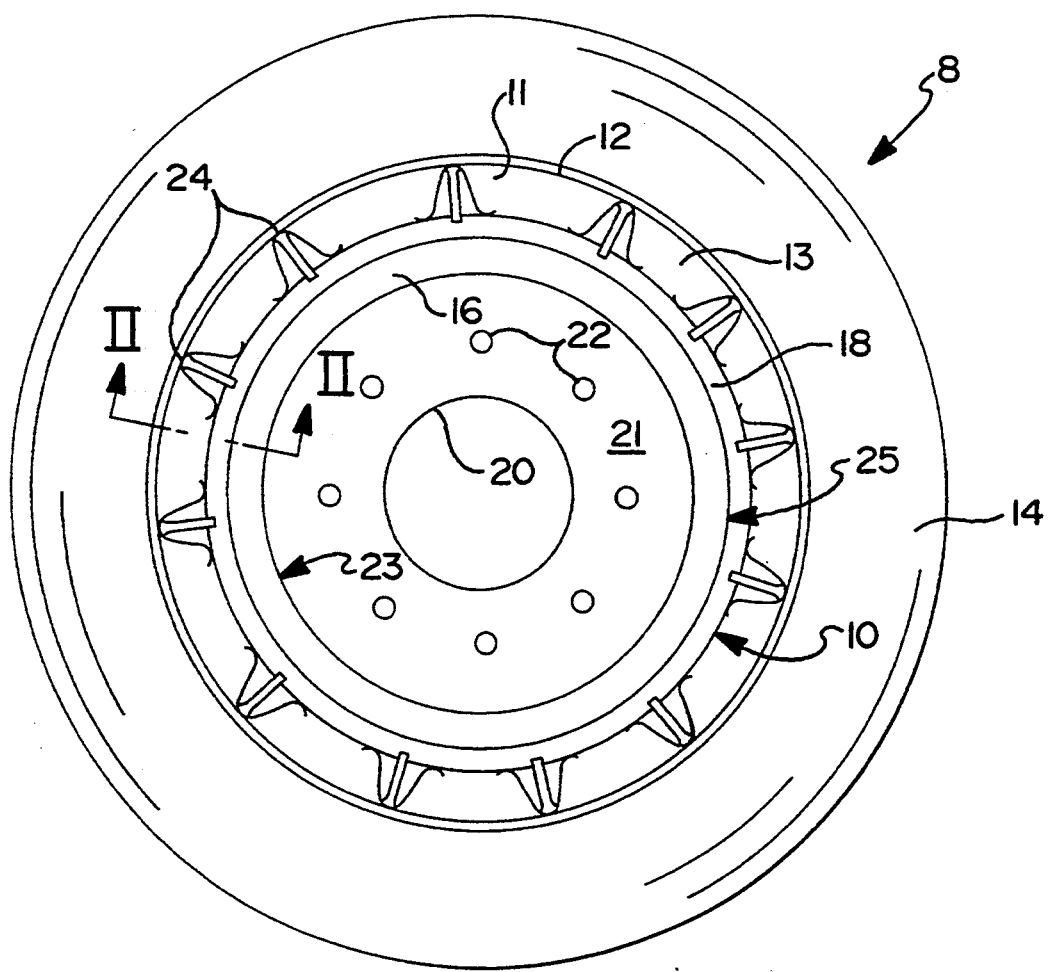
FIG. 1 is a rear elevational view of a tire mounted on a rim which is in turn mounted to a brake drum, the assembly of which incorporates the spring clip dampener of the present invention.

Certain terminology will be used in the following description for convenience in reference only and will not be limiting. The words "upwardly", "downwardly", "rightwardly" and "leftwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

Now referring to FIG. 1, a vehicle tire 14 is shown mounted to a vehicle wheel 11 which encircles an annular brake drum 10. The brake drum 10 is normally mounted to a vehicle axle (not shown) by way of a plurality of mounting bolts passing through mounting holes 22 and pilots on the axle by way of pilot aperture 20. Wheel rim 12 extends circumferentially about and is radially spaced from the brake drum 10 as is common in wheel assemblies for trucks and other large vehicles. The brake drum 10 is annular in shape having a closed end formed by a flange 21 and an open end opposite the flange 21. The brake drum 10 includes a cylindrical drum section 16 upon which is mounted an annular squealer band 18 and includes a friction inner surface 23 and an outer surface 25 where the flange 21 is mounted to a vehicle axle (not shown) by way of a plurality of mounting holes 22 and rides on pilot aperture 20. This construction forms an annular gap 13 between the squealer band 18 and the rim 12. The brake drum 10 has a friction inner surface 23 which is suitably engaged by brake shoes (not shown) in order to apply a braking force to the wheel assembly 8. The brake drum 10 also has an outer surface 25 upon which is formed a squealer band 18 which is an annular ring formed as part of the brake drum 10 and specifically as part of the drum section 16 close to the open end facing the viewer in FIG. 1 and functions to reduce the level of vibration of the brake drum 10 thereby lowering the resulting level of brake squeal.

Within the gap 13 are placed a plurality of spring clip dampeners 24 which are made of a spring steel material or any other material that provides a spring-like quality and properly functions at elevated temperatures encountered in the severe service environment of a vehicle brake. The spring clip dampeners 24 provide a separation force between the rim 12 and the squealer band 18 and, in addition to that separation force, provides a significant level of vibration dampening to the squealer band 18 which significantly reduces the level of brake squeal noise. The spring clip dampener 24 can be mounted in a variety of circumferential positions along the squealer band 18 depending on the vibration mode shapes of the brake drum 10. Ideally, the spring clip dampeners 24 would be positioned at the vibration anti nodes of the drum section 16 when excited at the natural frequency that results in brake squeal.

Figure 2:
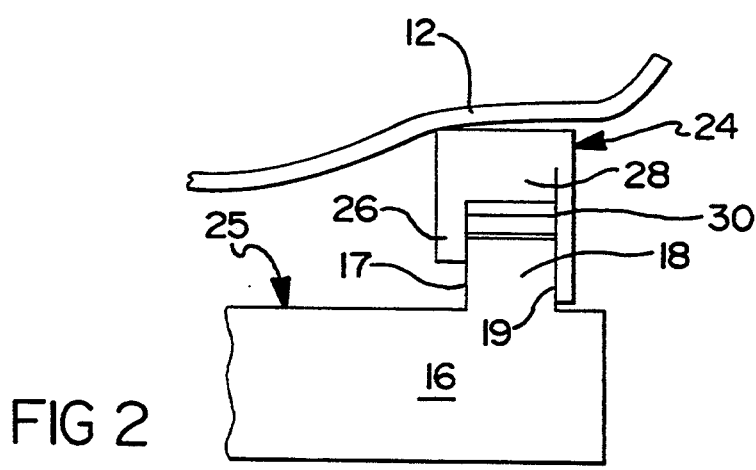
FIG. 2 is a sectional view of the spring clip dampener of the present invention mounted between a wheel rim and a brake drum on the squealer band.

Now referring to FIG. 2, which is cross-section 11—11 of FIG. 1, the spring clip dampener 24 of the present invention is shown fitted in the gap 13 between the rim 12 and the squealer band 18. The spring clip dampener 24 is primarily formed by a leaf spring section 28 which is compressed in its height when the spring clip dampener 24 is compressed and then inserted in the gap 13 between the wheel rim 12 and the squealer band 18. The spring clip dampener 24 provides a separation force and frictional dampening due to relative movement of the outer surface 25 of the drum section 16 specifically at the squealer band 18 in relation to the wheel rim 12. The spring clip dampener 24 is held in place by a pair of inner tabs 26 which extends from the leaf spring section 28 and contact the inner face 17 of the squealer band 18 as more clearly shown in FIG. 4. On the opposite side, an outer tab 30 also extends from the leaf spring section 28 to press against the outer face 19 of the squealer band 18 where the inner tab 26 and the outer tab 30 work together to hold the spring clip dampener 24 in position between the wheel rim 12 and the squealer band 18.

Now referring to FIG. 3, a top view of the spring clip dampener 24 of the present invention is shown which, especially in conjunction with FIG. 4, more clearly illustrates the structure of the inner tab 26 and the outer tab 30 which can both be formed from a flat piece of spring steel along with the leaf spring section 28 which can then be bent into final form or, in the alternative, one or both can be separately formed and welded or otherwise attached to the leaf spring section 28.

FIG. 4 is a side elevational view of the spring clip dampener 24 of the present invention in which the shape and function of the inner tab 26 and the outer tab 30 are more clearly illustrated. The inner tabs 26 are split away from the leaf spring section 28 extending downward to engage the inner face 17 of the squealer band 18 where the leaf spring section 28 has two spring ends 36 which are curved upward to facilitate installation and to provide a frictional contact between the spring clip dampener 24 of the present invention and the squealer band 18 to provide a high level of dampening to lower brake squeal.

The outer tab 30 extends from the center section of the leaf spring section 28 downward to ride against the outer face 19 of the squealer band 18. In combination, the inner tabs 26 and the outer tab 30 maintain the position of the spring clip dampener 24 inbetween the wheel rim 12 and the squealer band 18 providing for easy installation and security in positioning.

FIG. 5 illustrates an alternate embodiment of the present invention where the inner tabs 26 have been removed and the spring clip dampener 24' is retained in position on the squealer band 18 using an annular retention ring 38. The retention ring 38 frictionally engages the outer surface 25 of the drum section 16 or is split and bolted together so as to clamp onto the drum section 16. The retention ring 38 is positioned to press against the outer tab 30 of each of the plurality of spring clip dampeners 24' to hold them securely in position along the circumference of the squealer band 18 and under the wheel rim 12. This alternate embodiment of the spring clip dampener 24' provides for ease of installation and removal since the inner tabs 26 do not have to be manipulated over the top of the squealer band 18 which would require the leaf spring section 28 to be flexed to a greater extent.

A plurality of spring clip dampeners of the present invention circumferentially positioned between the wheel rim and the brake squealer band reduces the brake squeal noise in the wheel/drum assembly by increasing vibration dampening. The spring clip dampener of the present invention may be readily installed and removed without special tools and may be readily positioned as desired along the circumference of the squealer band. In addition to dampening brake noise, the spring clip dampener utilized in the assembly will allow road deflection of the rim with respect to the drum.

Although this invention has been described in its preferred form with a certain degree of particularity, it is understood that the present disclosure of the preferred form has been made only by way of example only in that numerous changes in the details and construction and combination and arrangement of parts may be resorted to without departing from the spirit and the scope of the invention as here and now claimed.

We claim:

1. A spring clip dampener comprising:
a leaf spring section having a radius of curvature oriented concave inward;
first and second end sections attached to said leaf spring section, said first and second end sections having a radius of curvature oriented concave outward;

a pair of inner tabs attached to a first edge of said leaf spring section extending from said first end section and said second end section respectively;

an outer tab attached to a second edge of said leaf spring section opposite to said inner tabs at a midpoint of said leaf spring section extending along a second edge of said leaf spring beyond said first and second end sections.

2. A drum brake assembly with reduced brake squeal noise comprising:

an annular brake drum having an axis of rotation and having an outer surface and an annular squealer band mounted to said outer surface, said squealer band having an inner face and an outer face, said brake drum having a flange end and an open end opposite to said flange end where said squealer band is mounted substantially adjacent to said open end;

a wheel comprised of an annular wheel rim radially spaced from said brake drum forming a gap between said squealer band and said wheel rim and having a hub section mounted to said flange, said wheel rim attached to said hub section;

a spring clip dampener mounted between said rim and said squealer band within said gap comprised of a leaf spring section, said leaf spring section having a first end contacting said squealer band, a center section contacting said wheel rim, and a second end contacting said squealer band imparting a separation force between said squealer band and said wheel rim, a pair of inner tabs attached to a first edge of said leaf spring section, a first inner tab extending from said first end and a second inner tab extending from said second end toward said squealer band both overlapping said inner face of said squealer band, and an outer tab attached to a second edge of said leaf spring section extending from said center section radially inward toward said squealer band overlapping said outer face of said squealer band where said spring clip dampener creates a separation force between said squealer band and said wheel rim and increases the level of vibration dampening on said squealer band thereby lowering brake squeal noise level.

3. The drum brake assembly of claim 2, wherein said first end has a radius of curvature therein, said first end oriented concave outward and said second end has a radius of curvature therein, said second end oriented concave outward and where said center section has a radius of curvature therein, said center section oriented concave inward.

4. The drum brake assembly of claim 2, wherein said first and second inner tabs and said outer tab are substantially parallel.

5. A method of dampening the vibration of a drum brake assembly comprising:

providing an annular brake drum having an axis of rotation and having an outer surface and an annular squealer band mounted to said outer surface and a flange end and an open end opposite to said flange end where said squealer band is mounted substantially adjacent to said open end;

a wheel comprised of an annular wheel rim radially spaced from said brake drum forming a gap between said squealer band and said wheel rim and having a hub section mounted to said flange, said wheel rim attached to said hub section;

providing a spring clip dampener comprised of a leaf spring section having first and second ends curved opposite to a center section and displaced therefrom to occupy a space slightly larger than said gap, a pair of inner tabs extending from said leaf spring section at said first and second ends in a straight manner each inner tab diverging from said first and second ends respectively, and an outer tab extending from said center section toward said inner tabs along an edge of said leaf spring section;

compressing said spring clip dampener;

inserting said spring clip dampener into said gap, said first and second ends contacting said squealer band and said inner tabs overlapping said inner face of said squealer band and said outer tab overlapping said outer face of said squealer band;

releasing said spring clip dampener to expand thereby allowing said leaf spring center section to contact said wheel rim and said first and second ends to contact said squealer band generating a separation force between said wheel rim and said squealer band to create a frictional dampening force on said squealer band to lower brake squeal noise.

6. A drum brake assembly with reduced brake squeal noise comprising:

an annular brake drum having an axis of rotation and having an outer surface and an annular squealer band mounted to said outer surface, said squealer band having an inner face and an outer face, said brake drum having a flange end and an open end opposite to said flange end where said squealer band is mounted substantially adjacent to said open end;

a wheel comprised of an annular wheel rim radially spaced from said brake drum forming a gap between said squealer band and said wheel rim and having a hub section mounted to said flange, said wheel rim attached to said hub section;

a spring clip dampener mounted between said rim and said squealer band within said gap comprised of a leaf spring section, said leaf spring section having a first end contacting said squealer band, a center section contacting said wheel rim, and a second end contacting said squealer band imparting a separation force between said squealer band and said wheel rim, an outer tab attached to a second edge of said leaf spring section extending from said center section radially inward toward said squealer band overlapping said outer face of said squealer band, an annular retention band secured to said outside surface of said brake drum immediately adjacent to said outer face of said squealer band with said outer tab clamped between said outer face and said retention band where said dampener spring clip creates a separation force between said squealer band and said wheel rim and increases the level of vibration dampening on said squealer band thereby lowering brake squeal noise level.

7. The drum brake assembly of claim 6, wherein said first end has a radius of curvature therein, said first end oriented concave outward and said second end has a radius of curvature therein, said second end oriented concave outward and where said center section has a radius of curvature therein, said center section oriented concave inward.

* * * * *